United States Patent
Popescu et al.

(10) Patent No.: US 11,775,305 B2
(45) Date of Patent: Oct. 3, 2023

(54) SPECULATIVE USAGE OF PARALLEL DECODE UNITS

(71) Applicant: Arm Limited, Cambridge (GB)

(72) Inventors: Adrian Viorel Popescu, Cambridge (GB); Remus-Gabriel Vultur, London (GB); Jatin Bhartia, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/560,643

(22) Filed: Dec. 23, 2021

(65) Prior Publication Data

US 2023/0205537 A1 Jun. 29, 2023

(51) Int. Cl.
*G06F 9/38* (2018.01)
*G06F 9/30* (2018.01)

(52) U.S. Cl.
CPC ........ *G06F 9/3814* (2013.01); *G06F 9/30149* (2013.01); *G06F 9/3822* (2013.01)

(58) Field of Classification Search
CPC ............... G06F 9/3822; G06F 9/30149; G06F 9/30152; G06F 9/3802; G06F 9/3814; G06F 9/3816; G06F 9/3818; G06F 9/30145
See application file for complete search history.

(56) References Cited

U.S. PATENT DOCUMENTS

| | | | |
|---|---|---|---|
| 5,630,083 A * | 5/1997 | Carbine | G06F 9/30145 712/E9.072 |
| 5,809,273 A * | 9/1998 | Favor | G06F 9/30152 712/213 |
| 6,043,765 A * | 3/2000 | Twardowski | H03M 7/4081 341/67 |
| 6,209,079 B1 * | 3/2001 | Otani | G06F 9/30181 712/210 |
| 6,308,257 B1 * | 10/2001 | Theogarajan | G06F 9/382 712/213 |
| 6,658,578 B1 * | 12/2003 | Laurenti | G06F 9/384 712/E9.032 |
| 6,889,313 B1 * | 5/2005 | Cofler | G06F 9/3822 712/210 |
| 2003/0236964 A1 * | 12/2003 | Madduri | G06F 9/30145 712/E9.05 |

(Continued)

*Primary Examiner* — Keith E Vicary
(74) *Attorney, Agent, or Firm* — NIXON & VANDERHYE P.C.

(57) ABSTRACT

Aspects of the present disclosure relate to an apparatus comprising fetch circuitry. The fetch circuitry comprises a pointer-based fetch queue for queuing processing instructions retrieved from a storage, and pointer storage for storing a pointer identifying a current fetch queue element. The apparatus comprises decode circuitry having a plurality of decode units, and fetch queue extraction circuitry to, based on the pointer, extract the content of a plurality of elements of the fetch queue; apply combinatorial logic to speculatively produce, from the content of said fetch queue entries, a plurality of speculative potential instructions; and transmit each speculative potential instruction to a corresponding one of said decode units. Each decode unit is configured to decode the corresponding speculative potential instruction. The instruction extraction circuitry is configured to extract a subset of said plurality of speculative potential instructions, and transmit said determined subset to pipeline component circuitry.

20 Claims, 5 Drawing Sheets

(56) References Cited

U.S. PATENT DOCUMENTS

| | | | |
|---|---|---|---|
| 2004/0128479 A1* | 7/2004 | Madduri | G06F 9/382 |
| | | | 712/210 |
| 2007/0033383 A1* | 2/2007 | Blasco Allue | G06F 9/30181 |
| | | | 712/209 |
| 2009/0019263 A1* | 1/2009 | Shen | G06F 9/3814 |
| | | | 712/210 |
| 2014/0281246 A1* | 9/2014 | Breternitz, Jr. | G06F 9/30152 |
| | | | 711/125 |
| 2020/0387375 A1* | 12/2020 | Yadavalli | G06F 9/30152 |

* cited by examiner

|   | 39-20 | 19-0 | ID |
|---|-------|------|-----|
| 0 | T16   | T16  | 00 |
| 1 | T32   |      | 01 |
| 2 | T32A  | T16  | 10 |
| 3 | T32A  | T32B | 10 |
| 4 | T16   | T32B | 00 |

SPECULATIVE USAGE OF PARALLEL DECODE UNITS

BACKGROUND

The present technique relates to the field of processing circuitry. Many processing circuitries include sub-units, for example to fetch, decode and execute program instructions. These sub-units may be arranged in a pipeline, such that a fetched instruction is passed to the decode circuitry for decoding, and then the decoded instruction is passed to execution circuitry to be executed.

Such a pipeline provides a fundamental bottleneck to the rate at which program instructions can be processed. For example, instructions cannot be processed any faster than the maximum throughput permitted by the pipeline. The pipeline also utilises resources in terms of power and silicon area.

It is thus desirable to improve the efficiency and functioning of such a pipeline, and in particular the timing and resource usage, in order to improve the performance and resource usage of the processing circuitry,

SUMMARY

At least some examples provide an apparatus comprising:
fetch circuitry comprising:
a pointer-based fetch queue for queuing processing instructions retrieved from a storage, the fetch queue comprising a plurality of elements, each element being for storing one or more of said queued instructions or a part of one or more of said queued instructions; and
pointer storage for storing a pointer identifying a current fetch queue element, decode circuitry comprising a plurality of decode units;
instruction extraction circuitry; and
fetch queue extraction circuitry to:
based on the pointer, extract the content of a plurality of elements of the fetch queue;
apply combinatorial logic to speculatively produce, from the content of said fetch queue entries, a plurality of speculative potential instructions; and
transmit each speculative potential instruction to a corresponding one of said decode units,
wherein:
each decode unit is configured to decode the corresponding speculative potential instruction; and
the instruction extraction circuitry is configured to extract a subset of said plurality of speculative potential instructions, and transmit said determined subset to pipeline component circuitry.

Further examples provide a method comprising:
extracting the content of a plurality of fetch queue elements from a fetch queue;
applying combinatorial logic to speculatively produce, from the content of said fetch queue entries, a plurality of speculative potential instructions;
transmit each speculative potential instruction to one of a plurality of decode units;
at said plurality of decode units, decoding received speculative potential instructions;
extracting a subset of said plurality of speculative potential instructions; and
transmitting said determined subset to pipeline component circuitry.

Further examples provide an apparatus comprising:
fetch means comprising:
a pointer-based fetch queue for queuing processing instructions retrieved from a storage, the fetch queue comprising a plurality of elements, each element being for storing one or more of said queued instructions; and
pointer storage for storing a pointer identifying a current fetch queue element, decode means comprising a plurality of decode units;
instruction extraction means; and
fetch queue extraction means to:
based on the pointer, extract the content of a plurality of elements of the fetch queue;
apply combinatorial logic to speculatively produce, from the content of said fetch queue entries, a plurality of speculative potential instructions; and
transmit each speculative potential instruction to a corresponding one of said decode units,
wherein:
each decode unit is configured to decode the corresponding speculative potential instruction; and
the instruction extraction means is configured to extract a subset of said plurality of speculative potential instructions, and transmit said determined subset to pipeline component means.

Further aspects, features and advantages of the present technique will be apparent from the following description of examples, which is to be read in conjunction with the accompanying drawings.

DESCRIPTION OF EXAMPLES

An example processing apparatus comprises fetch circuitry, decode circuitry, instruction extraction circuitry and fetch queue extraction circuitry. The fetch circuitry may form part of a processing pipeline, for example as the first element of such a pipeline which fetches instructions from storage and passes them on to the next element of the pipeline, culminating in an execution stage which executes fetched instructions.

The fetch circuitry comprises a pointer-based fetch queue for queuing processing instructions retrieved from a storage. The fetch queue comprises a plurality of elements, each element being for storing one or more of said queued instructions, or for storing a part of one or more of said queued instructions (such that a single instruction could be stored across multiple fetch queue elements).

The fetch queue further comprises pointer storage for storing a pointer identifying a current fetch queue element. The fetch queue can thus be moved through by moving the pointer through the queue. This consumes less power than a comparative fetch queue operating a shift-based first-in-first-out system, in which each element is read and re-written to the next element in order to move through the queue. However, the presently described fetch queue is more complex in terms of ensuring it fits in the same pipeline stage, as more complex logic is used. Aspects of the present disclosure can improve the timing characteristics of such a queue.

The decode queue comprises a plurality of decode units, one or more of which may be branch decode units. Each decode unit can decode instructions which were fetched by the fetch circuitry. The decode units can operate in parallel, thereby improving throughput.

The fetch queue extraction circuitry is configured to, based on the aforementioned pointer, extract the content of a plurality of elements of the fetch queue. The fetch queue extraction circuitry then applies combinatorial logic to speculatively produce, from the content of the fetch queue entries, a plurality of speculative potential instructions. The fetch queue extraction circuitry may comprise a plurality of multiplex units for applying this combinatorial logic.

The fetch queue extraction circuitry is configured to transmit each speculative potential instruction to a corresponding one of said decode units, wherein each decode unit is configured to decode the corresponding speculative potential instructions. Various logical configurations of the decode units are described in more detail below.

The instruction extraction circuitry is configured to extract a subset of the plurality of speculative potential instructions, and transmit this subset to pipeline component circuitry. The pipeline component circuitry may for example be a next pipeline component such as issue queue circuitry, in which the instructions are queued prior to being transmitted to further pipeline components including, for example, execution circuitry to ultimately execute the instructions.

Thus, the present example improves performance and the number of logic levels (sequentially between the given flop-to-flop path) by speculatively producing potential instructions and sending those instructions to be decoded. This speculative usage of parallel decode units allows optimisation of levels of logic gates (i.e. to ensure that everything that should be done in a given pipeline stage is done within that stage) whilst optimising power and silicon resource requirements, without compromising throughput.

In an example, the instruction extraction circuitry is configured to perform the above-described determination of the subset in parallel with the decoding, by the decode units, of the speculative potential instructions. This is possible because the subset can be determined without first waiting for the speculative potential instructions to be decoded. The overall time efficiency is thus improved, by performing these operations in parallel rather than consecutively.

In an example, each of said plurality of decode units is configured to decode instructions of a corresponding instruction type. The fetch queue extraction circuitry is configured to then provide instructions of a given instruction type to the corresponding decode unit. For example, each instruction type may be an instruction set, such that different units are configured to decode instructions of different instruction sets. This allows each decode unit to be optimised for decoding instructions of the associated type, thereby improving processing efficiency and resource consumption. As a particular example, the instruction sets may comprise a first instruction set with a first instruction size and a second instruction set with a second instruction size different to the first instruction size. A decoder associated with the smaller instruction size can thus be computationally simpler, thereby using less resources overall than in comparative examples in which all decoders (or a sole decoder) must be able to decode instructions with any instruction size that is supported by the apparatus as a whole.

In a related example, a first decode unit of said plurality of decode units is configured to decode processing instructions of the first instruction set, and a second decode unit of said plurality of decode units is configured to decode processing instructions of the second instruction set. The fetch queue extraction circuitry is configured to provide speculative potential instructions of the first instruction set to said first decode unit, and to provide speculative potential instructions of the second instruction set to said second decode unit. Decode units can thus be configured to decode instructions of particular instruction sets, thereby improving efficiency.

In an example, the instruction extraction circuitry is configured to extract, as a given instruction of said subset to provide to said pipeline component circuitry, one of said speculative potential instructions having a highest probability of being non-speculatively executed. For example, the instruction extraction circuitry, or another component of the apparatus, may perform an assessment of the likelihood of non-speculative execution of each speculative potential instruction. This improves efficiency by focussing resources on the instructions with the highest chance of non-speculative execution.

In an example, the plurality of decode units comprises a first decode unit and a second decode unit, and the first decode unit is configured to apply decode logic with lower computational complexity than the second decode unit. The fetch queue extraction circuitry is configured to provide speculative potential instructions to said first decode unit, and to provide non-speculative instructions to said second decode unit. This allows resources to be effectively focussed, by allowing non-speculative instructions to be decoded by the more complex second decode unit (whilst still allowing speculative potential instructions to be decoded by the less complex first decode unit). This is more efficient, overall, than comparative systems in which decode units are not specialised in this manner.

In an example, the fetch circuitry comprises an identification storage for storing element layout identification data associated with elements of the fetch queue. The element layout identification data may define a layout of instructions relative to elements of the fetch queue, for example a start position of a given instruction within a fetch queue entry, and/or data indicative of the size of a given instruction. Thus, for a given element of the fetch queue, the associated element layout identification data may identify an instruction layout within that given element. The instruction extraction circuitry is configured to extract the above-described subset based on the element layout identification data.

The fetch circuitry may be responsive to writing a given element of the fetch queue to store, in the identification storage, element layout identification data associated with the given instruction. Similarly, the fetch circuitry may be responsive to the content of a given element being extracted from the fetch queue to remove, from the identification storage, the element layout identification data associated with the given entry and to transmit the element layout identification data associated with the given entry to the instruction extraction circuitry. The element layout identification data is thus kept up-to-date.

In one such example, the identification storage comprises a first-in-first-out, FIFO, memory structure. This is a computationally efficient way of storing the element layout identification data, into which an entry is written when a corresponding entry is added to the fetch queue, and from which an entry is removed when the corresponding entry is removed from the fetch queue.

Alternatively or additionally, the fetch queue extraction circuitry may be configured to retrieve, from the identification storage, element layout identification data associated with a given extracted fetch queue element. The fetch queue extraction circuitry then performs said speculative producing of the plurality of speculative processing instructions based on said element layout identification data associated with the given extracted fetch queue element. The speculative production can thus be informed by the element layout identification data and thereby have higher speculation accuracy (i.e. a higher chance of correct speculation).

In an example, the fetch queue extraction circuitry is configured to perform said extracting, producing and transmitting steps within a single pipeline stage of the apparatus. This allows assurance that that everything that is expected to be performed within a given pipeline stage is performed within that stage. Unexpected delays and lags are thereby avoided.

Examples of the present disclosure will now be described with reference to the drawings.

Figure 1:
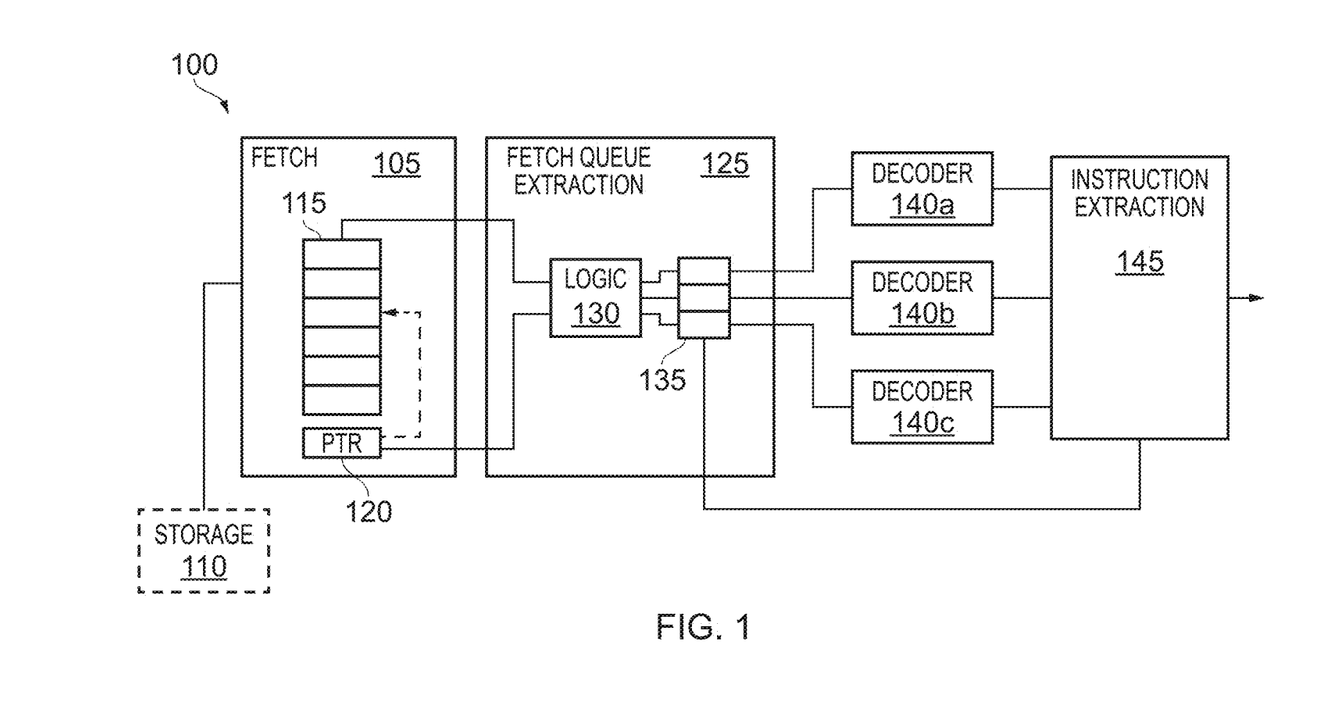
FIG. 1 depicts an apparatus according to an example.

FIG. 1 schematically shows an apparatus 100 according to an example. The apparatus comprises a fetch unit 105 configured to fetch processing instructions from a storage 110. The fetch unit 105 comprises a fetch queue 115 comprising a number of entries (also referred to as elements), into which fetched processing instructions are placed. The fetch unit 105 further comprises a storage for a pointer 120, which points to a current fetch queue entry. Thus, in order to work through the fetch queue 115, the pointer is moved through the queue in sequence (as opposed to, for example, shifting instructions through the queue in a first-in-first-out fashion).

The apparatus 100 further comprises fetch queue extraction circuitry 125. This is shown schematically as a particular module in FIG. 1, but this functionality may be performed by various hardware units as described in more detail below. The fetch queue extraction circuitry 125 uses the pointer 120 to determine a current location in the fetch queue and, based on this, extracts the content of a plurality of fetch queue entries. This content corresponds to a number of processing instructions.

The fetch queue extraction circuitry 125 uses combinatorial logic 130 to speculatively produce speculative potential instructions 135 from the extracted fetch queue entries. Examples of this combinatorial logic are described in more detail below. As an example, the combinatorial logic may take into account multiple ways in which instructions can be distributed and laid out across the extracted fetch queue entries.

The apparatus 100 further comprises decode units 140a, 140b, 140c. Each of the aforementioned speculative potential instructions are transmitted to a corresponding decode unit 140a, 140b, 140c, which may for example be optimised for decoding instructions of a particular type.

Finally, the apparatus 100 comprises instruction extraction circuitry 145, which extracts a subset of the speculative potential instructions (for example including speculative instructions which the instruction extraction circuitry 145 determines to have the highest chance of non-speculative execution) and transmits these to the a next pipeline element. This next element may for example be an issue unit for issuing instructions to execution circuitry.

Figure 2:
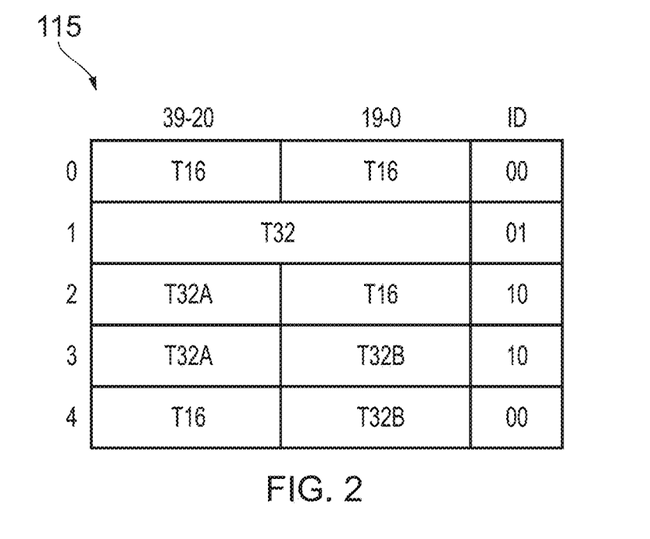
FIG. 2 depicts a fetch queue according to an example.

FIG. 2 depicts a fetch queue 115 according to an example.

The fetch queue 115 comprises five entries of length 2L, each shown as a numbered row 0-4 with bits 2L-1:L and L-1:0 shown separately. In this example, the system supports an instruction set I(L) having instructions which fit into half a fetch queue entry, e.g. L-bit instructions, and an instruction set I(2L) having instructions which fit into a full fetch queue entry (e.g. 2L-bit instructions). These may, in some examples, be parts of a single variable-instruction-length instruction set. Various layouts of instructions across the fetch queue elements are thus possible, depending on the order in which instructions of the different instruction sets are received. Specifically, the fetch queue entries are 2L-bit aligned, and so each entry can hold one or two I(L) instructions, or an I(L) instruction and half of an I(2L) instruction, or an I(2L) instruction, or half of an I(2L) instruction, or two halves of different I(2L) instructions.

Each fetch queue entry has an associated two-bit layout ID, indicating which layout applies to the given entry. Specifically, the right bit relates to entry bits 0:L-1, and the left bit relates to entry bits L:2L-1. For each bit, a 1 indicates that the relevant entry contains the first half of a I(2L) instruction, and a 0 indicates that the relevant entry portion either contains an entire I(L) instruction, or the second half of a I(2L) instruction. In other examples, other ID bit formats may be used. For example, there may be more than 1 ID bit per L bits in a fetch queue entry.

Thus:

Entry 0 contains two I (L) instructions, and has a layout ID of 00.

Entry 1 contains a single I (2L) instruction, and has a layout ID of 01.

Entry 2 contains an I(L) instruction, followed by the first half of a I(20 instruction, and has a layout ID of 10.

Entry 3 contains the second half of the I(2L) instruction that began in entry 2, followed by the first half of a subsequent I(2L) instruction, and has a layout ID of 10.

Entry 4 contains the second half of the I(2L) instruction that began in entry 3, followed by an I(L) instruction, and has a layout ID of 00.

The same layout ID can thus indicate different layouts, but this ambiguity can be resolved with knowledge of the previous entry. For example, whilst entry 4 has the same layout ID as entry 0, it is clear from entry 3 that entry 4 will begin with the second half of the I(2L) instruction that began in entry 3.

There may also be a bit (not shown) indicating whether the first instruction in the fetch queue begins at bit 0 or bit L.

Figure 3:
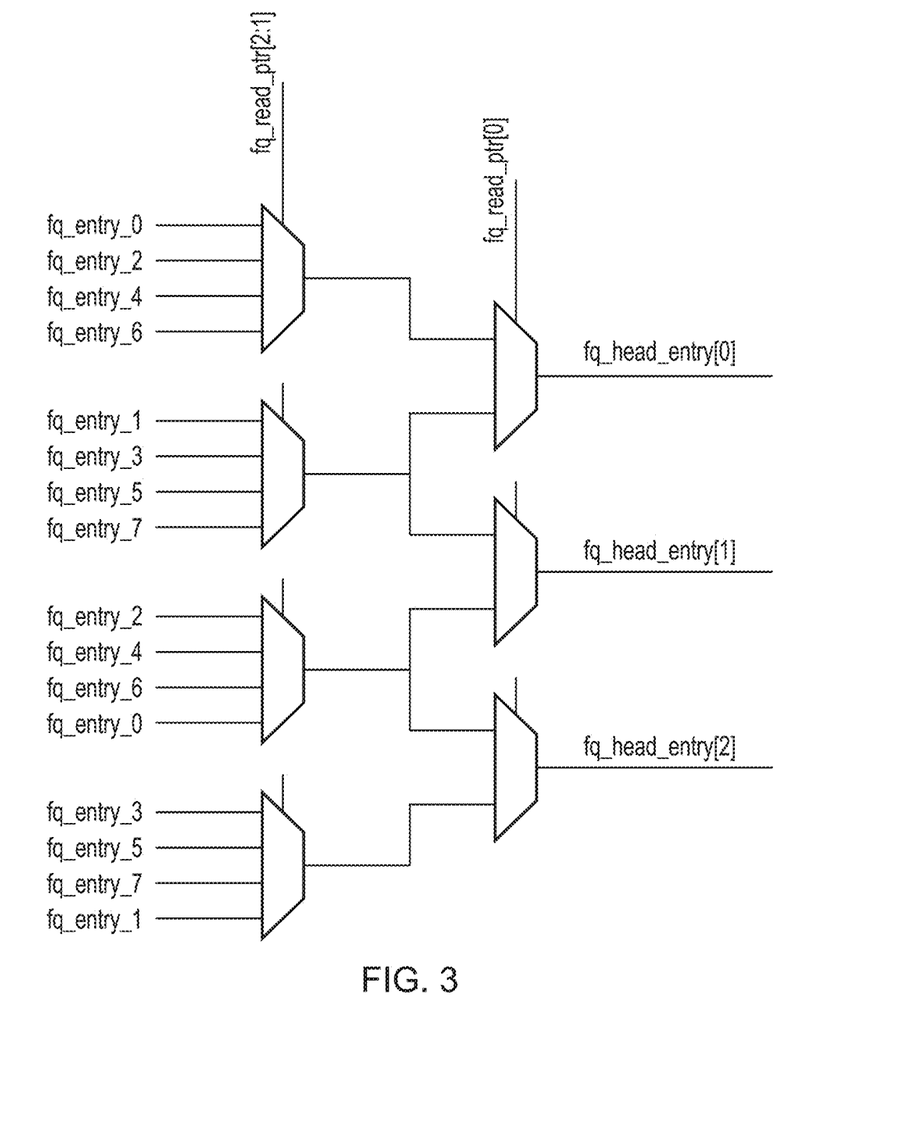
FIG. 3 illustrates an example of combinatorial logic which may be applied by fetch queue extraction circuitry.

FIG. 3 schematically depicts an example of the combinatorial logic 130 which the above-described fetch queue extraction circuitry 125 applies, in an example. In this example, three fetch queue entries (FQHE0, FQHE1 and FQHE2) are extracted from a fetch queue 115. The fetch queue 115 of this example contains 8 entries (FQ[0], FQ[1], FQ[2], FQ[3], FQ[4], FQ[5], FQ[6] and FQ[7]) which, as explained above, do not have a fixed mapping to the layout of instructions within the queue 115. These three fetch queue head entries will be used to produce five speculative instructions, as described in more detail below in connection with FIG. 4.

In addition to the fetch queue entries, the multiplexers receive selector information Selectorinfo1 and Selectorinfo0. These are generated based on the current instruction pointer (identifying the current instruction), and the above-described layout ID bits, which are used to select the fetch queue head entries. Regarding the layout ID bits, whenever an entry is written into the fetch queue 115, the layout ID bits are stored (for example in a first-in-first-out, FIFO, data structure). Similarly, whenever entries are popped from the fetch queue 115, the fetch queue extraction circuitry is updated with stored layout ID bits. Thus, in every cycle, the data for computing the selectors is available and this in turn means these selectors will be available early in the cycle.

Naively, three 8:1 multiplexers could be used to extract three entries from the 8-entry fetch queue. However, the example of FIG. 3 uses four 4:1 multiplexers and three 2:1 multiplexers. This is more computationally efficient and reduces resource consumption.

Figure 4:
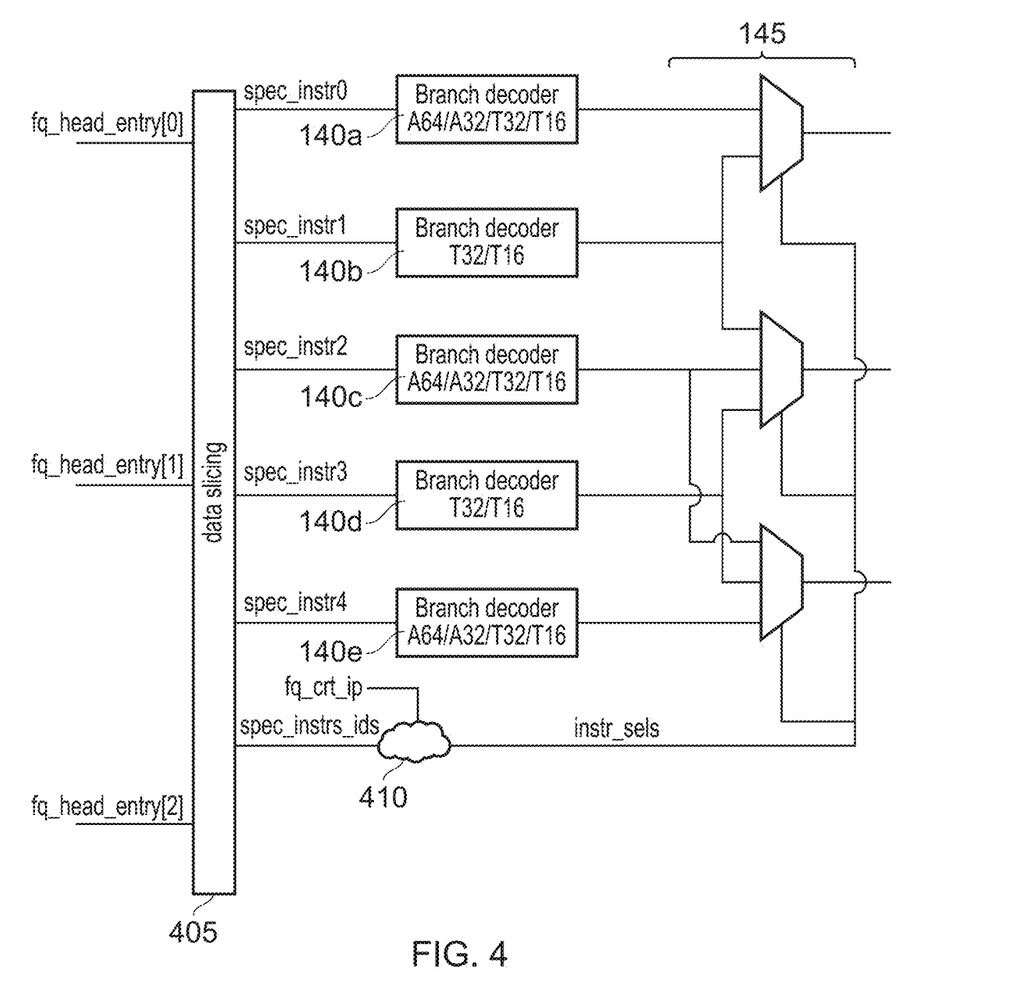
FIG. 4 depicts a logical layout of decode units and instruction extraction circuitry, according to an example.

FIG. 4 schematically depicts a logical layout of decode units 140a-140e (specifically branch decode units in this example) and instruction extraction circuitry 145, according to an example. In the present example, the above-mentioned I(L) and I(2L) instruction sets are supported. In addition, two further instruction sets are supported: I2(2L) and I3(2L), both of which have 2L-bit instructions which cannot be split across two fetch queue entries. Thus, in addition to the layouts discussed above, a given fetch queue entry could contain a whole I2(2L) instruction or a whole I3(2L) instruction.

The depicted circuitry takes as an input three fetch queue head entries, FQHE0, FQHE1 and FQHE2, such as those described above in relation to FIG. 3.

The fetch queue head entries are received by data slicing unit 405, and divided into five speculative potential instructions SPEC0, SPEC1, SPEC2, SPEC3, SPEC4, SPEC5 as follows:

| | |
|---|---|
| SPEC0 | FQHE0[bits 2L-1:L], FQHE0[bits L-1:0] |
| SPEC1 | FQHE1[bits L-1:0], FQHE0[bits 2L-1:L] |
| SPEC2 | FQHE1[bits 2L-1:L], FQHE1[bits L-1:0] |
| SPEC3 | FQHE2[bits L-1:0], FQHE1[bits 2L-1:L] |
| SPEC4 | FQHE2[bits 2L-1:L], FQHE2[bits L-1:0] |

Thus, the first, third and fifth speculative potential instructions include the content of the first, second and third fetch queue head entries. respectively. The second speculative potential instruction includes the second half of the first fetch queue entry, followed by the first half of the second fetch queue entry. Similarly, the third speculative potential instruction includes the second half of the second fetch queue entry followed by the first half of the third fetch queue entry. Thus, all potential instruction layouts within the head entries are covered, bearing in mind that, as explained above, a given instruction may be held entirely within one fetch queue entry or split across two consecutive fetch queue entries.

Each speculative potential instruction is transmitted to a corresponding decode unit 140a-140e.

The first, third and fifth decode units 140a, 140c, 140e receive the first, third and fifth speculative potential instructions, SPEC0, SPEC2, SPEC4, respectively. Each of these speculative potential instructions could comprise a single I2(2L), I3(2L), I(2L) or I(L) instruction, or two I(L) instructions. These decode units 140a, 140c, 140e are thus configured to decode I2(2L), I3(2L), I(2L) and I(L) instructions.

The second and fourth decode units 140b, 140d receive the second and fourth speculative potential instructions, SPEC1, SPEC3, respectively. Each of these speculative potential instructions could comprise a single I(2L) instruction (split across the two corresponding fetch queue head entries), a single I(L) instruction, or two I(L) instructions. However, because I2(2L) and I3(2L) instructions are stored within a single fetch queue entry and cannot be split across two fetch queue entries, these speculatively potential instructions will not comprise I2(2L) or I3(2L) instructions. The second and fourth decode units 140b, 140d can thus not be configured to decode I2(2L) and I3(2L) instructions. They can thus be computationally simpler, and consume less resources, than the first, third and fifth decode units 140a, 140c, 140e. This is more efficient, and saves resources, relative to a comparative system in which all decode units must be able to decode instructions from any supported instruction set.

Instruction extraction circuitry 145 then extracts a subset of the decoded instructions for (non-speculative) execution. The instruction extraction circuitry 145 comprises a set of multiplexers for selecting the instructions. These multiplexers receive combinations of decoded instructions. Logic 410 uses the current instruction pointer IP, and the layout ID data for the speculative instructions LAYOUTIDS to determine selector information for the decoded speculative instructions. The multiplexers receive this selector information and, based on this, select and output decoded instructions INSTR0, INSTR1 and INSTR2 to be executed. These instructions are then transmitted to a next processing pipeline stage, for example an issue queue from which they are to be issued to execution circuitry.

The determination of the selector information, based on the current instruction pointer and the layout ID data for the speculative instructions, can be performed in parallel with the (speculative) decoding of the speculative potential instructions by the decode units 140a-140e. The overall time to output selected decoded instructions is thereby reduced, improving the ability to perform, within a single pipeline stage, all of the actions which are expected to be performed within that stage.

Other optimisations of the decode units are possible in other examples. In one example, the decode units are optimised based on the probability of a given instruction being non-speculatively executed. For example, computationally lighter decode units may be assigned to speculative paths, whilst computationally heavier decode units are assigned to a subset of the speculative potential instructions which are determined to be likely to be non-speculatively executed. As another example, some speculative potential instructions with a lower probability of being executed, but which end up being non-speculatively executed, are restricted so as to restrict the number of such instructions which are pushed to the next pipeline component. In the next clock cycle, such instructions would be at the top of the fetch queue and thus have a higher probability of non-speculative execution.

Figure 5:
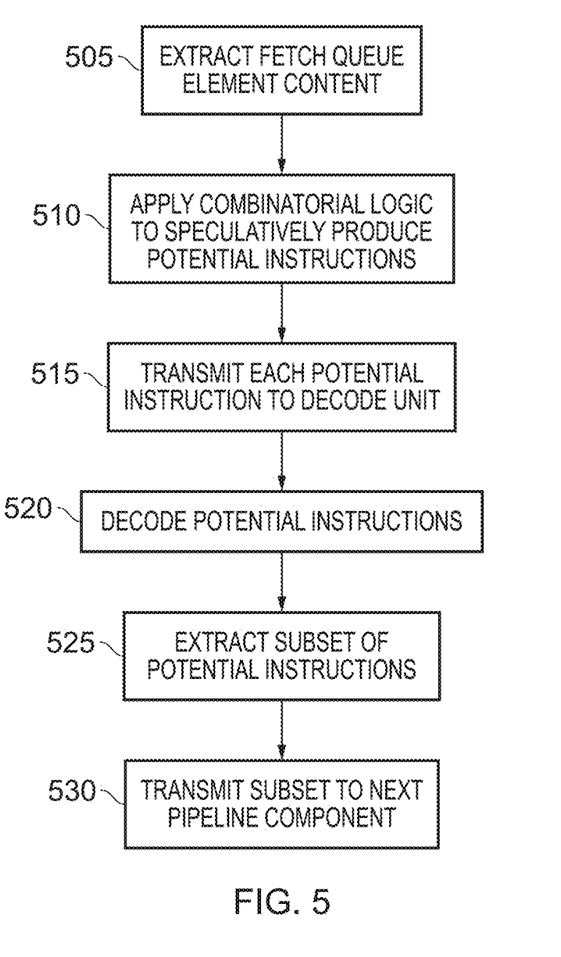
FIG. 5 illustrates a method according to an example.

FIG. 5 illustrates a method according to an example of the present disclosure, which may for example be implemented by the apparatus 100 of FIG. 1.

At block 505, the content of a plurality of fetch queue elements is extracted from a fetch queue.

At block 510, combinatorial logic is applied to speculatively produce, from the extracted fetch queue entry content, a plurality of speculative potential instructions.

At block 515, each speculative potential instruction is transmitted to one of a plurality of decode units.

At block 520, the speculative potential instructions are decoded at the plurality of decode units (each instruction being decoded by the decode unit which received it).

At block 525, a subset of said plurality of speculative potential instructions is extracted.

At block 530, the extracted subset of speculative potential instructions is transmitted to a next pipeline element.

Apparatuses and methods are thus provided for decoding instructions based on fetch queue entries, From the above description it will be seen that the techniques described herein provides a number of significant benefits. In particular, the computational efficiency and resource usage is improved, as is the ability to provide assurance that everything that should be performed within a given pipeline stage is actually performed within that pipeline stage.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

We claim:

1. An apparatus comprising:
fetch circuitry comprising:
a pointer-based fetch queue for queuing processing instructions retrieved from a storage, the pointer-based fetch queue comprising a plurality of elements, each element being for storing one or more of said queued processing instructions or a part of one or more of said queued processing instructions; and
pointer storage for storing a pointer identifying a current fetch queue element, decode circuitry comprising a plurality of decode units;
instruction extraction circuitry; and
fetch queue extraction circuitry to:
based on the pointer, extract content of a plurality of elements of the pointer-based fetch queue;
apply combinatorial logic to speculatively produce, from said content, a plurality of speculative potential instructions; and
transmit each speculative potential instruction to a corresponding one of said decode units,
wherein:
each decode unit is configured to decode the corresponding speculative potential instruction, thereby producing a plurality of decoded speculative potential instructions; and
the instruction extraction circuitry is configured to extract a subset of said plurality of decoded speculative potential instructions, and transmit said subset to pipeline component circuitry.

2. An apparatus according to claim 1, wherein the instruction extraction circuitry is configured to determine the subset in parallel with the decoding, by the decode units, of the speculative potential instructions.

3. An apparatus according to claim 1, wherein:
each of said plurality of decode units is configured to decode instructions of a corresponding instruction type; and
the fetch queue extraction circuitry is configured to provide instructions of a given instruction type to one of said plurality of decode units configured to decode instructions of the given type.

4. An apparatus according to claim 3, wherein each instruction type is one of a plurality of instruction sets.

5. An apparatus according to claim 4, wherein said plurality of instruction sets comprise a first instruction set with a first instruction size and a second instruction set with a second instruction size different to the first instruction size.

6. An apparatus according to claim 1, wherein the instruction extraction circuitry is configured to extract, as a given instruction of said subset to provide to said pipeline component circuitry, one of said speculative potential instructions having a highest probability of being non-speculatively executed.

7. An apparatus according to claim 1, wherein:
the plurality of decode units comprises a first decode unit and a second decode unit;
the first decode unit is configured to apply decode logic with lower computational complexity than the second decode unit;
the fetch queue extraction circuitry is configured to provide speculative potential instructions to said first decode unit; and
the fetch queue extraction circuitry is configured to provide non-speculative instructions to said second decode unit.

8. An apparatus according to claim 1, wherein:
a first decode unit of said plurality of decode units is configured to decode processing instructions of a first instruction set;
a second decode unit of said plurality of decode units is configured to decode processing instructions of a second instruction set;
the fetch queue extraction circuitry is configured to provide speculative potential instructions of the first instruction set to said first decode unit; and
the fetch queue extraction circuitry is configured to provide speculative potential instructions of the second instruction set to said second decode unit.

9. An apparatus according to claim 8, wherein:
the first instruction set has an associated first instruction length; and
the second instruction set has an associated second instruction length different from the first instruction length.

10. An apparatus according to claim 1, wherein:
the fetch circuitry comprises an identification storage for storing element layout identification data associated with elements of the pointer-based fetch queue; and
the instruction extraction circuitry is configured to extract said subset based on said element layout identification data.

11. An apparatus according to claim 10, wherein, for a given element of the pointer-based fetch queue, the associated element layout identification data identifies an instruction layout within said given element.

12. An apparatus according to claim 10, wherein the fetch circuitry is responsive to writing a given element of the pointer-based fetch queue to store, in the identification storage, element layout identification data associated with the given element.

13. An apparatus according to claim 10, wherein the fetch circuitry is responsive to content of a given element being extracted from the pointer-based fetch queue to remove, from the identification storage, element layout identification data associated with the given element and to transmit the element layout identification data associated with the given element to the instruction extraction circuitry.

14. An apparatus according to claim 10, wherein the identification storage comprises a first-in-first-out, FIFO, memory structure.

15. An apparatus according to claim 10, wherein the fetch queue extraction circuitry is configured to:

retrieve, from the identification storage, element layout identification data associated with a given extracted fetch queue element; and
speculatively produce the plurality of speculative potential instructions based on said element layout identification data associated with the given extracted fetch queue element.

16. An apparatus according to claim 1, wherein at least one of said plurality of decode units is a branch decode unit.

17. An apparatus according to claim 1, wherein the fetch queue extraction circuitry is configured to perform said extracting, producing and transmitting steps within a single pipeline stage of the apparatus.

18. An apparatus according to claim 1, wherein the fetch queue extraction circuitry comprises a plurality of multiplex units for applying said combinatorial logic.

19. A method comprising:
    extracting content of a plurality of fetch queue elements from a pointer-based fetch queue;
    applying combinatorial logic to speculatively produce, from said content, a plurality of speculative potential instructions;
    transmitting each speculative potential instruction to a corresponding one of a plurality of decode units;
    at said plurality of decode units, decoding received speculative potential instructions, thereby producing a plurality of decoded speculative potential instructions;
    extracting a subset of said plurality of decoded speculative potential instructions; and
    transmitting said subset to pipeline component circuitry.

20. An apparatus comprising:
    means for fetching comprising:
        a pointer-based fetch queue for queuing processing instructions retrieved from a storage, the pointer-based fetch queue comprising a plurality of elements, each element being for storing one or more of said queued processing instructions; and
        pointer storage for storing a pointer identifying a current fetch queue element, means for decoding comprising a plurality of decode units;
    means for extracting instructions; and
    means for extracting information from the pointer-based fetch queue to:
        based on the pointer, extract content of a plurality of elements of the pointer-based fetch queue;
        apply combinatorial logic to speculatively produce, from said content, a plurality of speculative potential instructions; and
        transmit each speculative potential instruction to a corresponding one of said decode units,
    wherein:
        each decode unit is configured to decode the corresponding speculative potential instruction, thereby producing a plurality of decoded speculative potential instructions; and
        the means for extracting instructions is configured to extract a subset of said plurality of decoded speculative potential instructions, and transmit said subset to pipeline component means.

* * * * *